United States Patent [19]
Grandpierre

[11] Patent Number: 5,854,704
[45] Date of Patent: Dec. 29, 1998

[54] RECEIVER FOR OPTICAL DIGITAL TRANSMISSION SYSTEM

[75] Inventor: Georges Grandpierre, Guibeville, France

[73] Assignee: Alcatel Submarine Networks, Clichy, France

[21] Appl. No.: 882,259

[22] Filed: Jun. 25, 1997

[30] Foreign Application Priority Data

Jun. 26, 1996 [FR] France .................................. 96 07926

[51] Int. Cl.$^6$ .................................................. H04B 11/26
[52] U.S. Cl. ........................................... 359/189; 359/194
[58] Field of Search .................... 359/189, 190, 359/194, 337

[56] References Cited

U.S. PATENT DOCUMENTS

| | | | |
|---|---|---|---|
| 5,331,452 | 7/1994 | Smyth et al. ............................. | 359/189 |
| 5,335,109 | 8/1994 | Heidemann . | |
| 5,386,311 | 1/1995 | Shields .................................... | 359/184 |
| 5,555,119 | 9/1996 | Lewis ..................................... | 359/158 |

FOREIGN PATENT DOCUMENTS

0534433A2  3/1993  European Pat. Off. .

2262836  6/1993  United Kingdom .

OTHER PUBLICATIONS

H. Nakano et al, "High–gain 10 Gbit/s 3R optical repeater with direct clock extraction", IOOC–ECOC '91, 17th European Conference On Optical Communication, vol. 1, No. WEA9–5, 9–12 Sep. 1991, Paris, pp. 513–516.

Patent Abstracts of Japan, vol. 96, No. 001 corresponding to JP 08 108505 A (Nippon Telegr & Telph Corp) 19 Jan. 1996.

*Primary Examiner*—Mark Hellner
*Attorney, Agent, or Firm*—Sughrue, Mion, Zinn Macpeak & Seas, PLLC

[57] ABSTRACT

A receiver for digital optical signals, in particular in the soliton format, includes an automatic gain control amplifier and photodetectors for converting the optical signals into electrical signals in a data channel and a clock channel. For detecting signals transmitted optically at high bit rates, the automatic gain control amplifier is an optical amplifier and is on the input side of the photodetectors. There are preferably two photodetectors, the first of which is connected to a data processing channel and the second of which is connected to a clock signal recovery channel. This receiver can receive signals at bit rates exceeding 10 Gbit/s.

13 Claims, 2 Drawing Sheets

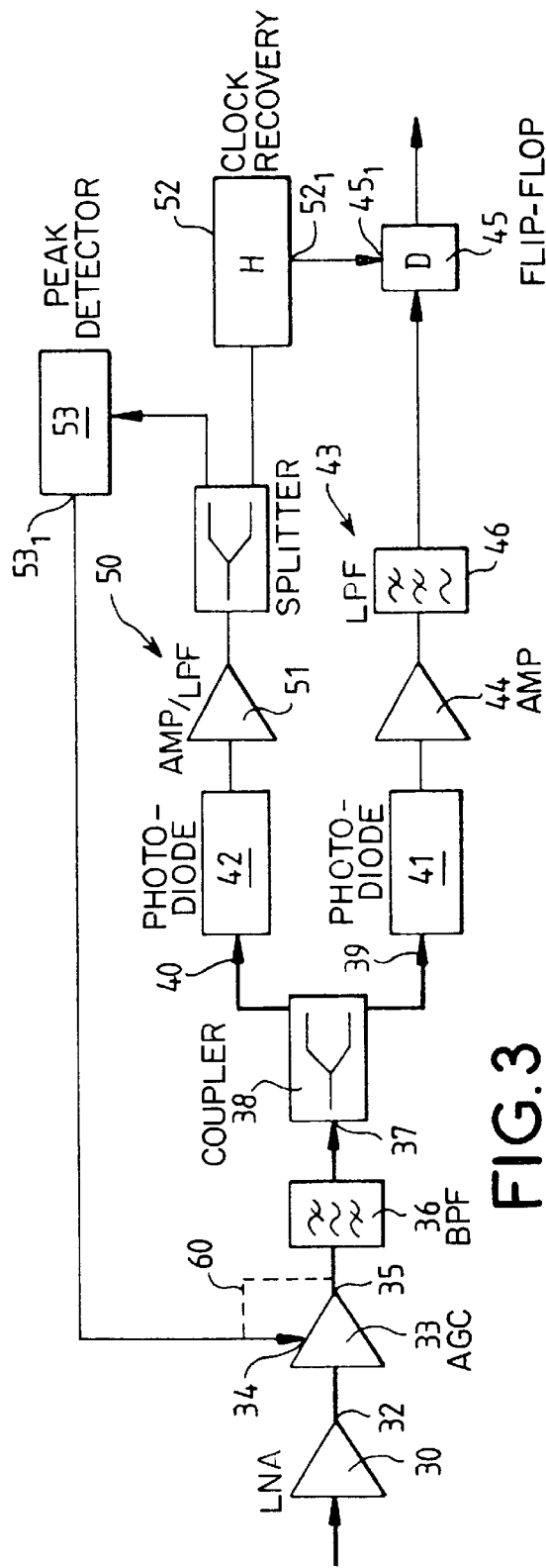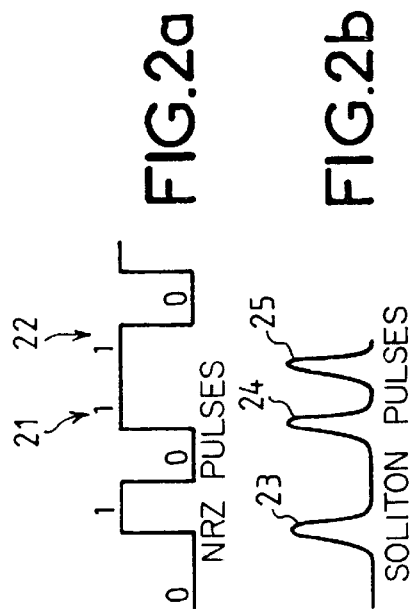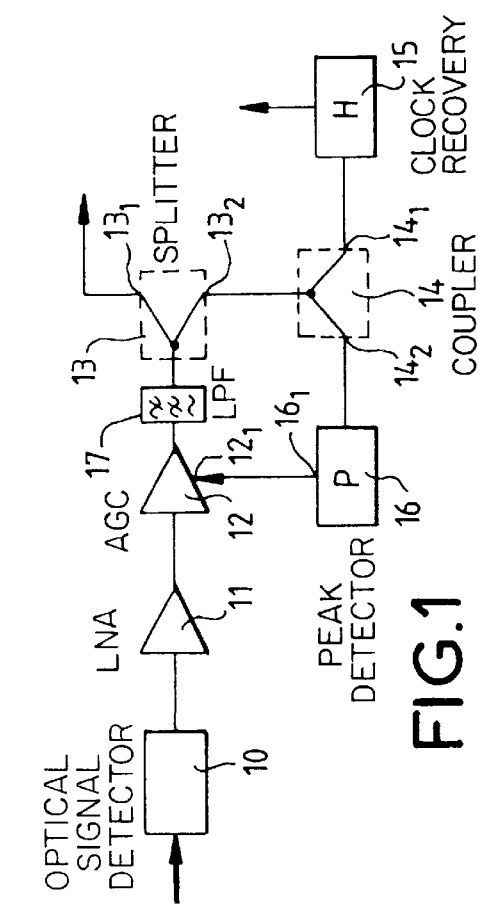

RECEIVER FOR OPTICAL DIGITAL TRANSMISSION SYSTEM

BACKGROUND OF THE INVENTION

1. Field of the Invention

The present invention relates to a receiver for optical digital signal transmission systems.

2. Description of the Prior Art

Fiber optic signal transmission is a technique increasingly used in various applications and in particular for submarine telephone lines. This technique provides high bit rates and wide bandwidths without significant deterioration of the signals.

The growth in telecommunications is leading to the design of optical transmission lines operating at ever higher data bit rates.

Current receivers give good results for bit rates up to around 5 Gbit/s. Reception quality is inadequate at higher bit rates, however.

One prior art receiver (FIG. 1) includes an optical signal detector 10, generally a photodiode, a high-gain low-noise pre-amplifier 11 and an automatic gain control (AGC) amplifier 12. The signals received by the photodiode 10 are digital (binary) signals. The output signal from the amplifier 12 is fed to the input of an electrical splitter 13 via a Bessel low-pass filter 17. The splitter has one output $13_1$ which supplies the output signal of the amplifier 12 to a data processing circuit (not shown) and one output $13_2$ connected to the input of a coupler 14.

The coupler 14 has two outputs $14_1$ and $14_2$; the output $14_1$ is connected to the input of a circuit 15 for processing and/or recovering the clock signal H and the output $14_2$ is connected to the input of a peak detector circuit 16. When the clock signal is present in the received signal, the circuit 15 filters and amplifies this signal; when the clock signal is not directly present in the received signal the circuit 15 processes the received signal to recover the clock. The circuit 16 provides at its output $16_1$ a signal representing the power of the output signal of the amplifier 12. The output $16_1$ is connected to the gain control input $12_1$ of the amplifier 12.

The gain is controlled so that the output signal of the amplifier 12 remains at a constant average level.

For bit rates above 5 Gbit/s the quality of the signals obtained at the output of a receiver of the type shown in FIG. 1 deteriorates compared to the quality of signals at lower bit rates. The deterioration is in the form of amplitude noise for the "0" bits and the "1" bits of the signal and uncertainty as to the temporal position of the information bits.

Research has shown that this deterioration originates from jitter introduced by the AGC amplifier 12 and from pollution by the circuits 15 and 16 whose respective inputs inject polluting signals which disrupt the data signals. The couplers 13 and 14 can also contribute to this pollution.

Furthermore, the amplifier 12 is difficult to implement for a wide bandwidth without distorting the pulses.

Accordingly, the FIG. 1 receiver is not suitable for lines having to transmit information at bit rates exceeding 10 Gbit/s, although bit rates up to 40 Gbit/s are required.

The document HIGH-GAIN 10 Gbit/s 3R OPTICAL REPEATER WITH DIRECT CLOCK EXTRACTION, by H. NAKANO et al, IOOC-ECOC'91 ,17th EUROPEAN CONFERENCE ON OPTICAL COMMUNICATION, vol.1, n° WEA9-5, 9–12 Sep. 1991, PARIS, FRANCE, page 515, discloses a 10 Gbit/s optical signal receiver including a fixed-gain optical pre-amplifier on the input side of a photodiode. The electrical signal supplied by the photodiode is amplified by two electronic amplifiers in cascade and is then fed to two channels: a data processing channel and a clock signal recovery channel.

The aim of the invention is to propose a receiver catering for an even higher bit rate.

SUMMARY OF THE INVENTION

The invention consists in a digital optical receiver including photodetector means for converting optical signals into electrical signals on a data channel and a clock channel and including at least one optical amplifier on the input side of said photodetector means which comprise two photodetectors a first of which is connected to a data processing channel and the second of which is connected to a clock signal processing or recovery channel.

Separating the two channels before converting the optical signal into an electrical signal avoids the pollution phenomenon encountered in the prior art receivers. Moreover, it is possible to use in the data channel—that of the first photodetector—an amplifier of relatively low and fixed gain which is therefore easy to implement with optimal quality, i.e. which does not distort the pulses. These properties are favorable to the satisfactory operation of the receiver for very high bit rates.

In one preferred embodiment at least one optical amplifier on the input side of the photodetector means is a variable gain amplifier. With a receiver of this kind the detected pulses are not distorted, as when using an electric automatic gain control amplifier. Furthermore, an optical automatic gain control amplifier is easier to implement than an electrical amplifier with a wide bandwidth. Also, the optical signal detector which converts the optical signals into electrical signals receives a constant average power, which facilitates the implementation of the electronic circuits on its output side and contributes to signal quality.

Other features and advantages of the invention will emerge from the following description of certain embodiments of the invention given with reference to the accompanying drawings.

BRIEF DESCRIPTION OF THE DRAWINGS

FIG. 1, already described, shows a prior art receiver.

FIGS. 2a and 2b are diagrams representing signals in an optical telecommunication system.

FIG. 3 is a schematic of one preferred embodiment of a receiver in accordance with the invention.

DETAILED DESCRIPTION OF THE PREFERRED EMBODIMENTS

Figure 4:
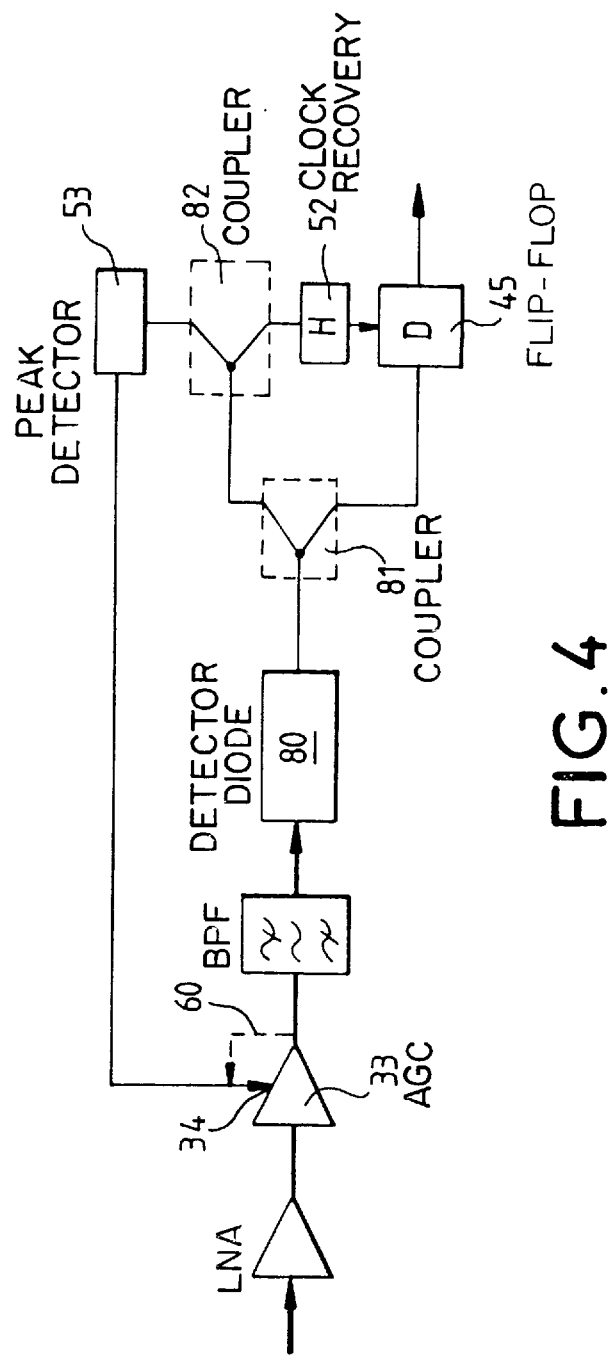
FIG. 4 is a schematic of a variant embodiment.

The embodiment of the invention to be described with reference to FIGS. 3 and 4 is designed to receive signals from an optical system for transmitting data, such as telephone data, and in particular transmission using underwater (submarine) cables.

The pulses transmitted via the line are NRZ pulses, as shown in FIG. 2a, or soliton pulses, as shown in FIG. 2b.

NRZ pulses are rectangular with a low (0) level and a high (1) level. The signal does not return to the low level (no return to zero) between two successive "1" 21 and 22 (FIG. 2a).

In soliton pulses (FIG. 2b) the "1" are represented by peaks 23, 24, 25, etc. The signal returns to "0" between two successive "1". Each pulse has a high peak power. Its average power is relatively low, however, compared to NRZ pulses.

However, the remainder of the description refers only to soliton transmission. NRZ or RZ transmission, or transmission using other similar formats, is of course within the scope of the invention.

The receiver shown in FIG. 3 has an optical amplifier 30 at the input with a fixed relatively high gain and a low noise factor. The gain is in the order of 20 dB (i.e. a power gain of 100 or a voltage gain of 10). The optical amplifier 30 is of the doped fiber type, for example. Its output 31 is connected to the input 32 of another optical amplifier 33, also of the doped fiber type, with a gain control input 34. In a manner that is known in itself, the gain is controlled by the intensity of the pump current (not shown) exciting a laser that constitutes the optical amplifier 33.

The output 35 of the optical amplifier 33 is connected to the input of a band-pass optical filter 36 the output of which is connected to the input 37 of an optical coupler 38 having two outputs 39 and 40 which deliver identical light signals. The light signal from the output 39 is detected by a PIN photodiode 41. The light signal from the output 40 is detected by a second PIN photodiode 42.

The data signals are extracted from the photodiode 41 and the clock signal and a signal representing the peaks of the data signal (the soliton pulses) are extracted from the photodiode 42.

The data signal extraction (electric) channel 43 includes an amplifier 44 of constant low gain on the output side of the photodiode 41. The output of the amplifier 44 is connected to a D-type flip-flop 45 by a low-pass filter 46 such as a Bessel filter.

The (electric) channel 50 for recovering or processing the clock signal and generating the peak detection signal includes a low-gain amplifier 51 connected to the output of the photodiode 42, to a clock processing or recovery circuit 52 and to a peak detector circuit 53 via an electric splitter 54 the input of which is connected to the output of the amplifier 51 and the two outputs of which are connected to respective inputs of the circuits 52 and 53.

The output 521 of the clock recovery circuit 52 is connected to the clock input $45_1$ of the D-type flip-flop 45.

The output $53_1$ of the peak detector circuit 53 is connected to the gain control input 34 of the optical amplifier 33.

In this example, the amplifier 51 of the peak detection signal generation and clock signal recovery channel 50 has a low-pass filter function, in addition to its amplification function, in order to peak limit the soliton pulses. This property enables the gain of the amplifier 33 to be controlled exclusively in accordance with the average power of the soliton pulses and not the peak power. The peak limiting effected by the amplifier filter 51 does not interfere with the recovery of the clock signal by the circuit 52.

The low-pass Bessel filter 46 in the data recovery channel 43 improves the signal to noise ratio.

The receiver just described with reference to FIG. 3 has many advantages compared to the prior art receiver shown in FIG. 1. In particular:

The photodiode 41 always receives a signal of maximal value because it is on the output side of the automatic gain control optical amplifier 33, the gain of which is controlled so that a substantially constant optical signal is delivered at its output and this signal can have the optimal value. In FIG. 1, the corresponding photodiode 10 does not always receive a signal of optimal value as it is on the input side of the automatic gain control amplifier 12. With the invention, the photodiode 41 therefore receives an optical signal of optimal value which masks the inherent thermal noise of the photodiode.

Likewise, the photodiode 42 receives an optical signal of optimal value.

As already mentioned, optimizing the signals received by the photodiodes optimizes the choice and the implementation of the electronic circuits on the output side of the photodiodes 41 and 42.

The amplifier 44 on the output side of the photodiode 41 therefore has a constant low gain which makes it relatively easy to implement and which is favorable to maintaining the shape of the pulses. This feature contributes greatly to the ability of the receiver to detect pulses at very high bit rates, in the order of 20 Gbit/s and above.

Using an automatic gain control optical amplifier 33 in place of an automatic gain control electric amplifier is particularly favorable to the detection of pulses at high bit rates without distortion.

Finally, the peak detector and clock signal recovery circuits 53 and 52 are virtually independent, from the electrical point of view, of the data channel. This limits pollution of the data channel by the signals from the circuits 52 and 53.

In a variant embodiment indicated by the dashed line 60 in FIG. 3 the automatic gain control of the optical amplifier 33 is effected optically by connecting the output 35 of this amplifier to its gain control input 34. In this variant embodiment the circuit 53 is not present.

In another variant embodiment, shown in FIG. 4, there is only one detector diode 80 which is connected to a first coupler 81 one output of which is connected to a D-type flip-flop 45 and the other output of which is connected to a second coupler 82 having one output for a clock recovery circuit 52 and one output connected to a peak detector circuit 53 which controls the gain control input 34 of the optical amplifier 33. In a variant of FIG. 4 there is no circuit 53 but instead a connection 60 between the output of the amplifier 33 and its gain control input 34, as in the variant described above with reference to FIG. 3.

The embodiment shown in FIG. 4 offers lower performance than is obtained from that of FIG. 3. Here, "performance" means the quality of the signal obtained. It is of lower cost, however, since it includes a small number of components and, compared to the prior art receiver, it retains the advantage of operating at very high bit rates, in particular due to the presence of the automatic gain control optical amplifier 33.

There is claimed:

1. A digital optical receiver including photodetector means for converting optical signals into electrical signals on a data channel and a clock channel and including at least one optical amplifier on the input side of said photodetector means which comprise two photodetectors a first of which is connected to a data processing channel and the second of which is connected to a clock signal processing or recovery channel.

2. The receiver claimed in claim 1 wherein at least one optical amplifier on the input side of said photodetector means is a variable gain amplifier.

3. The receiver claimed in claim 1 wherein said channel connected to said second photodetector includes a device for controlling the gain of said optical amplifier.

4. The receiver claimed in claim 3 wherein said channel connected to said second photodetector includes pulse peak limiter means on the input side of said device for controlling the gain of said optical amplifier.

5. A receiver as claimed in claim 1 including in said channel connected to said second photodetector an amplifier of fixed and relatively low gain.

6. A receiver as claimed in claim 1 including an electric amplifier of fixed and relatively low gain in said data signal recovery channel on the output side of said first photodetector.

7. The receiver claimed in claim 1 wherein the received digital pulses are soliton pulses.

8. The receiver claimed in claim 1 wherein the received pulses are NRZ pulses.

9. A receiver as claimed in claim 1 including a connection from the output of said optical amplifier to its gain control input to control the gain of said optical amplifier.

10. The receiver claimed in claim 1 wherein the gain of said optical amplifier is controlled by adjusting the pump current of a laser constituting said optical amplifier.

11. A receiver as claimed in claim 1 including a constant gain low-noise optical amplifier.

12. The receiver claimed in claim 11 wherein said constant gain low-noise optical amplifier is on the input side of said automatic gain control optical amplifier.

13. The receiver claimed in claim 1 wherein said data bit rate is at least 10 Gbit/s.

* * * * *